United States Patent [19]
Bleier

[11] Patent Number: 5,589,991
[45] Date of Patent: Dec. 31, 1996

[54] OPTICAL ASSEMBLY WITH FOLDING MIRROR ASSEMBLY

[75] Inventor: Zvi Bleier, Comack, N.Y.

[73] Assignee: PLX Inc., Deer Park, N.Y.

[21] Appl. No.: 156,023

[22] Filed: Nov. 19, 1993

[51] Int. Cl.⁶ .......................... G02B 5/08; G02B 7/182; G03B 13/08
[52] U.S. Cl. .......................... 359/856; 359/857; 359/861; 359/871; 396/385; 396/386
[58] Field of Search .................................. 359/529, 530, 359/546, 856, 857, 861, 871; 354/219, 220, 221, 222, 223, 224, 225

[56] References Cited

U.S. PATENT DOCUMENTS

| | | |
|---|---|---|
| 3,663,084 | 5/1972 | Lipkins . |
| 3,977,765 | 8/1976 | Lipkins . |
| 3,981,021 | 9/1976 | Beecher . |
| 3,985,421 | 10/1976 | Beecher . |
| 4,065,204 | 12/1977 | Lipkins . |
| 4,140,567 | 2/1979 | Beecher . |
| 4,140,568 | 2/1979 | Beecher . |
| 4,272,153 | 6/1981 | Beecher . |
| 4,319,804 | 3/1982 | Lipkins . |
| 4,488,790 | 12/1984 | Beecher . |
| 4,526,444 | 7/1985 | Fantone et al. ............ 354/225 |
| 4,758,077 | 7/1988 | Beecher . |
| 4,999,658 | 3/1991 | Kamitani et al. .......... 354/225 |
| 5,024,514 | 6/1991 | Bleier et al. . |
| 5,122,901 | 6/1992 | Bleier . |
| 5,301,067 | 4/1994 | Bleier et al. . |
| 5,335,111 | 8/1994 | Bleier . |
| 5,361,171 | 11/1994 | Bleier . |

FOREIGN PATENT DOCUMENTS

| | | | |
|---|---|---|---|
| 0219726 | 9/1989 | Japan ...................... | 354/225 |
| 4280241 | 10/1992 | Japan ...................... | 354/225 |

*Primary Examiner*—Ricky D. Shafer
*Attorney, Agent, or Firm*—Gottlieb Rackman & Reisman, P.C.

[57] ABSTRACT

An optical assembly with a folding mirror assembly is provided. The folding mirror assembly comprises first and second reflecting members having first through fourth reflecting surfaces and mounting means for mounting the reflecting members thereon. The first reflecting member has first and second reflecting surfaces in reflecting relation with each other, and the second reflecting member has third and fourth reflecting surfaces in reflecting relation with each other. The mounting means comprises a plate member having mounting pads, so that when first and second reflecting members are mounted to the mounting pads of the plate member, the third reflecting surface of the second reflecting member is in reflecting relation with the first reflecting surface of the first reflecting member. The reflecting members comprise mirror panels and a support panel, all of the panels having first sides and first surfaces wherein the first side of each of the panels is abutting and joined to the first surface of the panel adjacent to the abutting panel. The optical assembly with a folding mirror assembly comprises an eyepiece, at least one lens and the abovedescribed folding mirror assembly.

33 Claims, 2 Drawing Sheets

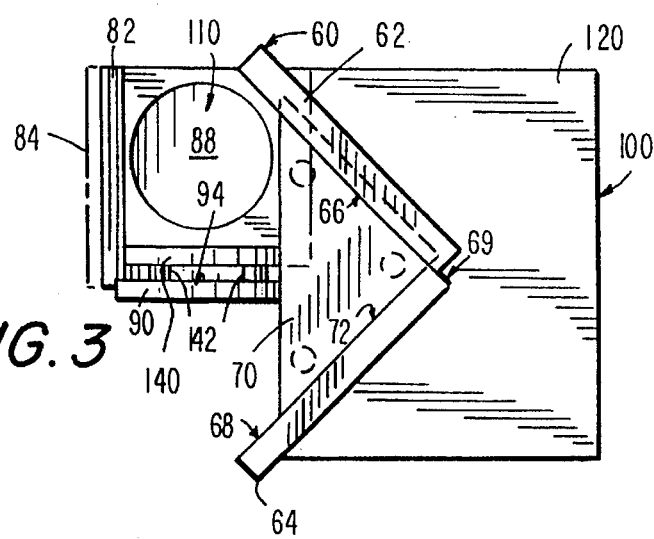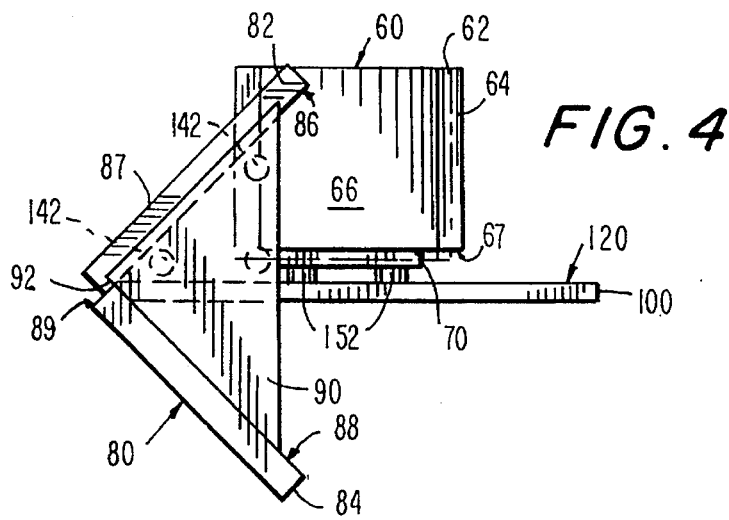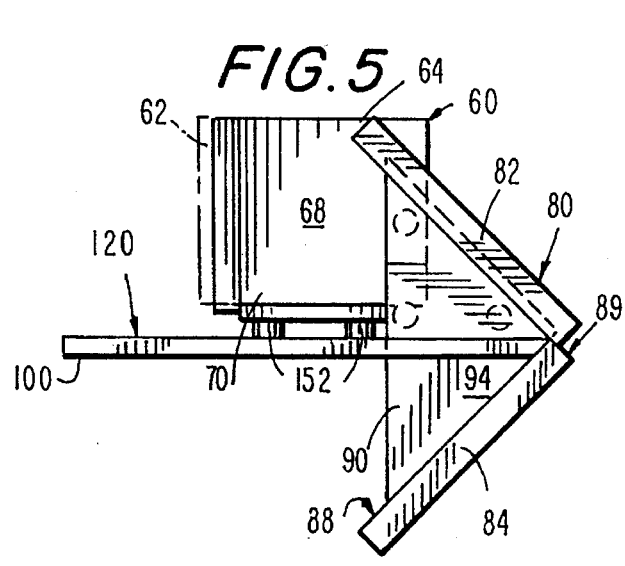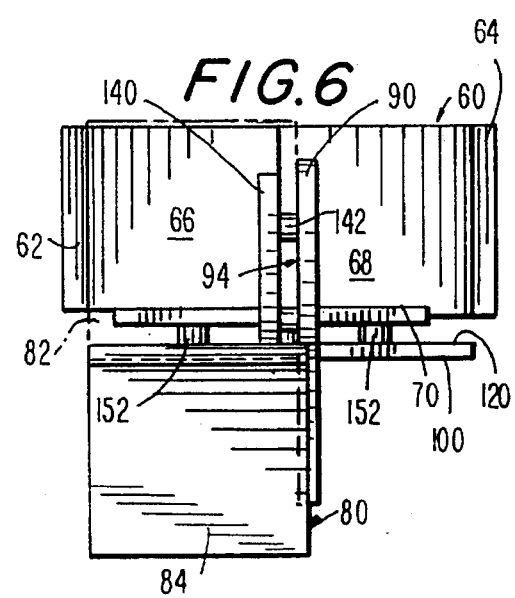

12,589,991

OPTICAL ASSEMBLY WITH FOLDING MIRROR ASSEMBLY

BACKGROUND OF THE INVENTION

This invention relates to the field of optical assemblies, and more particularly to an optical assembly with a folding mirror assembly for magnifying objects which is both light weight and precise.

Magnifying optical assemblies are old in the art. They consist of many different shapes and forms, most commonly, telescopes, binoculars, microscopes and magnifying glasses. Magnifying optical assemblies in general have the essential property of causing incident light beams emitted from an object to be passed through the optical assembly such that the image appears closer to the viewer, and therefore, magnified.

These prior art optical assemblies, although able to achieve many multiples of magnification, are limited in their ability to achieve large magnification along with high precision in a light weight structure. Specifically, the prior art optical assemblies which are able to achieve high magnification and high precision are usually large and heavy, while those assemblies which are, in fact, light weight, do not achieve high magnification and/or precision.

Accordingly, it would be desirable to provide an optical assembly that provides high magnification, high precision and is still light weight for ease of use.

SUMMARY OF THE INVENTION

In accordance with the invention, an improved optical assembly with a folding mirror assembly is provided. The folding mirror assembly comprises first and second reflecting members having first through fourth reflecting surfaces and mounting means for mounting the reflecting members thereon. The first reflecting member has first and second reflecting surfaces in reflecting relation with each other, and the second reflecting member has third and fourth reflecting surfaces in reflecting relation with each other. The mounting means comprises a plate member having mounting pads, so that when first and second reflecting members are mounted to the mounting pads of the plate member, the third reflecting surface of the second reflecting member is in reflecting relation with the first reflecting surface of the first reflecting member.

The reflecting members comprise mirror panels and a support panel, all of the panels having first sides and first surfaces wherein the first side of each of the panels is abutting and joined to the first surface of the panel adjacent to the abutting panel.

The optical assembly with a folding mirror assembly comprises an eyepiece, at least one lens and the above-described folding mirror assembly.

Accordingly, it is an object of the invention to provide an improved optical assembly with a folding mirror assembly.

Still another object of the invention is to provide an optical assembly with a folding mirror assembly which is light weight and able to achieve high precision.

Yet another object of the invention is to provide an optical assembly with a folding mirror assembly which is light weight, able to achieve high precision and high magnification.

Other objects of the invention will in part be obvious and will in part be apparent from the following description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 3 is a plan view of the folding mirror assembly according to the invention;

FIG. 4 is a side elevational view of the folding mirror assembly of FIG. 3;

FIG. 5 is an opposite side elevational view of the folding mirror assembly of FIG. 3; and FIG. 6 is a front elevational view of the folding mirror assembly of FIG. 3.

DETAILED DESCRIPTION OF THE PREFERRED EMBODIMENTS

Figure 1:
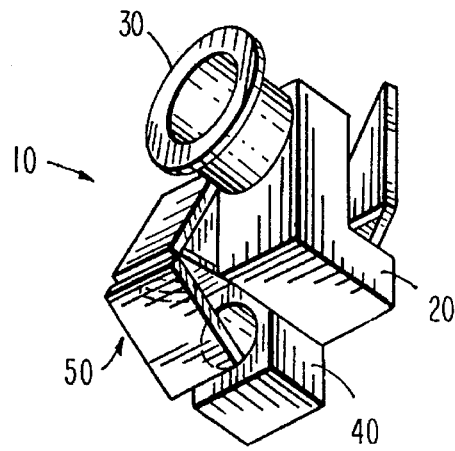
FIG. 1 is a perspective view of an optical assembly with a folding mirror assembly in accordance with the invention.

Referring first to FIG. 1, an optical assembly with a folding mirror assembly made in accordance with the invention and generally designated at 10 is shown. Optical assembly with folding mirror assembly 10 includes folding mirror assembly 50, eyepiece assembly 30, lens assembly 40 and casing 20.

Figure 2:
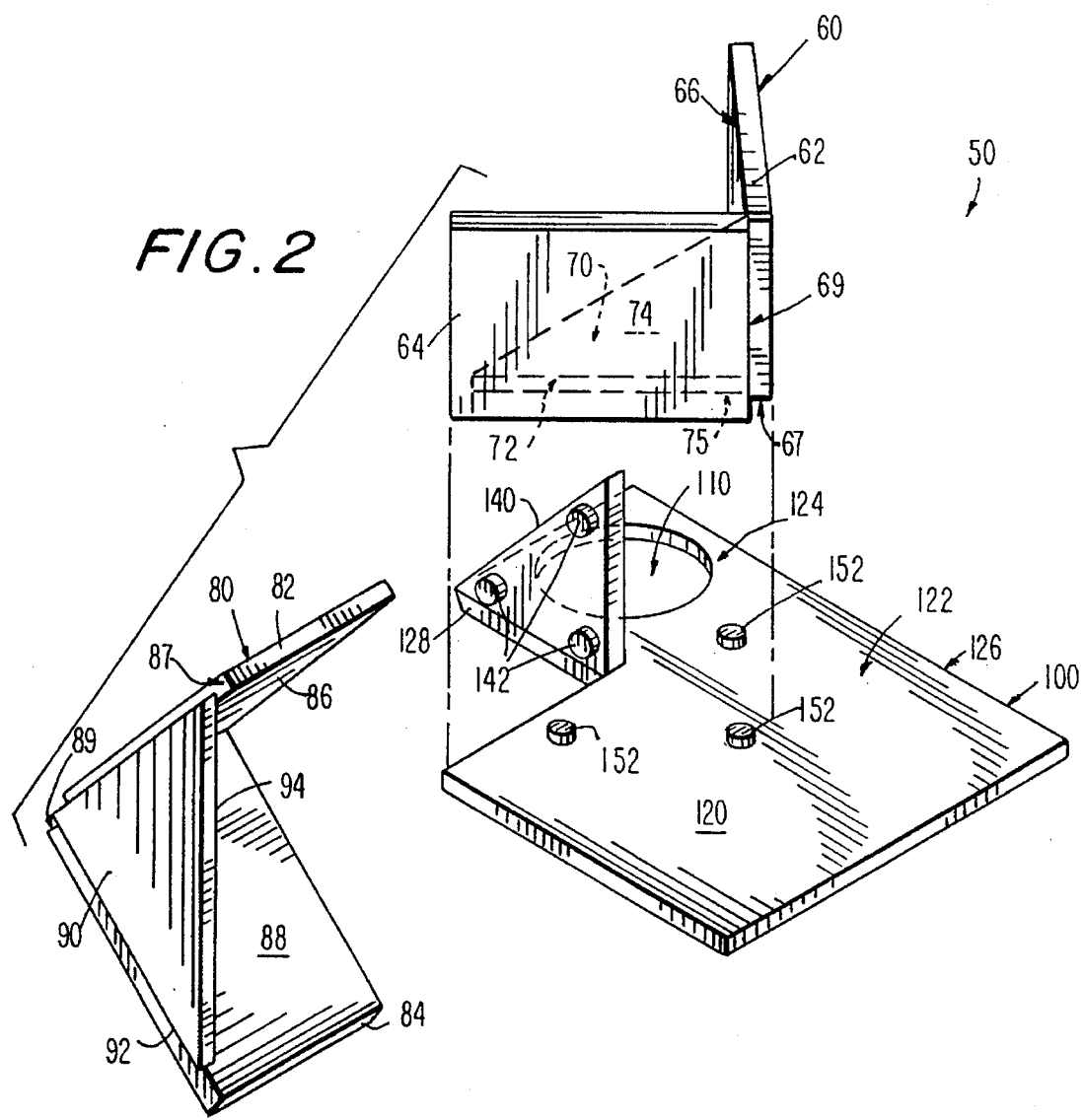
FIG. 2 is an exploded, perspective view of a folding mirror assembly in accordance with the invention.

Folding mirror assembly 50, as shown in FIGS. 2–6, has first and second reflecting members 60 and 80, each reflecting member mounted to a plate member 100. First reflecting member 60 comprises a first mirror panel 62 having an optically flat reflecting surface 66, a second mirror panel 64 having an optically flat reflecting surface 68, and a support panel 70, as is best shown in FIGS. 2 and 3. Second reflecting member 80 comprises a third mirror panel 82 having an optically flat reflecting surface S6, a fourth mirror panel S4 having an optically flat reflecting surface 88, and a support panel 90. Reflecting members 60 and 80 are assembled having the above discussed elements, in substantially the same manner, as will be discussed in more detail below.

The optically flat reflecting surfaces 66, 68, 86 and 88 are, for the purposes of this disclosure, considered to be highly flat mirrored surfaces which maintain an accuracy requirement of LAMBDA($\lambda$)/10 peak to valley wave front error. The meeting of this accuracy requirement ensures a high precision assembly, but is not meant to limit the scope of the invention.

Both reflecting members 60 and 80 are assembled substantially in accordance to the innovative hollow retroreflector structure previously patented in U.S. Pat. No. 3,663,084 to Lipkins. Specifically, mirror panels 62 and 64 and support panel 70 of first reflecting member 60, and mirror panels 82 and 84 and support panel 90 of second reflecting member 80 are bonded at right angles to each other in the known alternating, overlapping hollow retroreflector construction.

Briefly, and in accordance with this construction, and as best shown in FIG. 2, each of panels 62, 64, 70, 82, 84, and 90 have first surfaces 76 and first sides 78 which are at right angles to each other. As assembled, each of first sides 78 of the panels are partially abutted against and joined to first surface 76 of the panel which is adjacent to it. Accordingly, each of the panels simultaneously abuts against an adjacent panel along its first side 78, while it is itself abutted against by the first side 78 of the other adjacent panel. More particularly, turning to second reflecting member 60, shown in FIG. 2, mirror panel 82 has reflecting surface 86 and an abutting side 87, mirror panel 84 has reflecting surface 88 and an abutting side 89, while support panel 90 has a receiving surface 94 and an abutting side 92. Abutting side 87 of panel 82 abuts against receiving surface 94 of panel 90, while abutting side 92 of panel 90 abuts against reflecting surface 88 of panel 84, and while abutting side 89 of panel 84 abuts against reflecting surface 86 of panel 82. A similar construction for reflecting member 60 is also achieved. Reflecting member 60 achieves the above-discussed alternating, overlapping hollow retroreflector structure for reflecting member 80 by having an abutting side 67 of mirror panel 62 abutted against receiving surface 74 of support panel 70, an abutting side 69 of mirror panel 64 abutted against reflecting surface 66 of mirror panel 62, and an abutting side 72 of support panel 70 abutted against reflecting surface 68 of mirror panel 64.

Continuing with the construction of reflecting members 60 and 80 as discussed above, these members are constructed according to the hollow retroreflector art in order to maintain the optically flat reflecting surfaces of the mirror panels in perpendicular relation with little distortional effects so that the system as a whole can achieve and maintain the previously discussed high accuracy of $\lambda/10$.

With the high accuracy and light weight natures of the inventive structure in mind, it is now necessary in the construction of folding mirror assembly 50 to mount reflecting members 60 and 80 in such a way that reflecting surface 86 of mirror panel 82 of reflecting member 80 is in reflecting relation with reflecting surface 66 of mirror panel 62 of reflecting member 60, as best shown in FIGS. 2 and 4. To achieve this mounted structure, a plate member 100 is used.

Plate member 100 has a mounting surface 120 onto which each of reflecting members 60 and 80 will ultimately be mounted. As best seen in FIG. 2, plate member 100 has a first portion 122 and a second portion 124. These portions are substantially square or rectangular; which will be dependent upon the size and design characteristics of the desired folding mirror assembly and optical assembly. First and second portions 122 and 124 are joined by a common first side 126.

Continuing with FIG. 2, second portion 124 of plate member 100 has an opening 110 extending therethrough. Opening 110 is between first side 126 and a second side 128. Opening 110 is preferably circular, however, it is anticipated that it can be any shape. As will be discussed in more detail below, and as is evident from FIGS. 1 and 2, a light beam from an image viewed through folding mirror 50 and/or optical assembly 10 enters through lens 40 reflects off of reflecting surface 88 of second reflecting member 80 and is sent through opening 110 so that it can reflect off of reflecting surface 86 of second reflecting member 80. The light beam is then reflected off of reflecting surfaces 66 and 68 of reflecting member 60 and then into eyepiece 30, from which the user views the object. However, prior to operation of the described apparatus, reflecting members 60 and 80 must be mounted to plate member 100 in a manner which is strong so as to secure against dislodgement, while also avoiding causing distortional forces to be applied to the reflecting members.

In accordance with the above, and as best seen in FIG. 2, reflecting members 60 and 80 are mounted to plate member 100 along support panels 70 and 90, respectively. A back surface 75 (see FIGS. 4–6) of support panel 70 is received onto and mounted onto, mounting pads 152 of plate member 100. Mounting pads 152 are themselves either mounted to first portion 122 of plate member 100, or are unitarily constructed with plate member 100, so that they protrude from first portion 122 of mounting surface 120, shown best in FIG. 2. Additionally, reflecting member 80 is mounted to plate member 100 by the mounting of receiving surface 94 of support panel 90 onto mounting pads 142, also best shown in FIG. 2.

Mounting pads 142 extend from a mounting panel 140, itself extending perpendicularly from second portion 124 of plate member 100. Mounting panel 140 is either integrally made to extend perpendicularly from second portion 124 of plate member 100, or is adhered thereto. Mounting panel 140 extends from second portion 124 proximate to second side 128 of plate member 100.

The mounting of reflecting members 60 and 80 to mounting pads 152 and 142, respectively, is achieved by placing an adhesive onto the mounting pads to secure the reflecting members. Preferably, there are three mounting pads 152 and three mounting pads 142. The use of three mounting pads for each reflecting member insures that the reflecting members are mounted to plate member 100 in a kinematic nature, thereby achieving the least number of adhesion points with maximum stability for the structure. As with the construction of reflecting members 60 and 80, any undue external forces, such as those forces from adhesives in contact with the structure which cure, may cause distortions to reflecting surfaces 66, 68, 86 and 88. Therefore, the reduced number of mounting points 152 and 142, and the reduced area of adhesive, reduces the likelihood of external stresses causing deformation of the reflecting surfaces during curing of the adhesive.

Accordingly, the folding mirror assembly and optical assembly with folding mirror assembly of the invention achieves a precisely constructed structure which folds light to achieve in a minimal space a long focal length, thereby allowing optimal magnification in a structure which is compact, light weight and highly accurate.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language might be said to fall therebetween.

What is claimed is:

1. A folding mirror assembly, comprising:
    at least first and second reflecting members, each of said reflecting members comprising first and second panels, each of said panels having a reflecting surface, said reflecting surface of said first panel disposed at substantially a right angle to said reflecting surface of said second panel, and a support panel having a receiving surface, wherein each of said panels has a side at substantially a right angle to said surface of said panel, and wherein each of said panels is abutting and joined along said side to said surface of said panel immediately adjacent to said side; and a plate member having a plurality of mouting pads for mounting said first and second reflecting members thereon so that one of said reflecting surfaces of said first reflecting member is in reflecting relation with one of said reflecting surfaces of said second reflecting member.

2. A folding mirror assembly as recited in claim 1, wherein said reflecting surfaces are optically flat.

3. A folding mirror assembly as recited in claim 1, wherein said one of said reflecting surfaces of said first reflecting member is disposed at substantially a 45° angle to said one of said reflecting surfaces of said second reflecting member.

4. A folding mirror assembly as recited in claim 1, wherein said first reflecting member is mounted to said plate member on three of said plurality of mounting pads.

5. A folding mirror assembly as recited in claim 4, wherein said second reflecting member is mounted to said plate member on three other of said plurality of mounting pads.

6. A folding mirror assembly as recited in claim 1, wherein said plurality of mounting pads of said plate member for mounting said first reflecting member extend from a top surface of said plate member.

7. A folding mirror assembly as recited in claim 6, wherein said plate member comprises a first portion and a second portion, said first and second portions having a common first side.

8. A folding mirror assembly as recited in claim 7, wherein said second portion of said plate member has a second side opposite said common first side.

9. A folding mirror assembly as recited in claim 8, wherein said plate member further comprises a mounting member extending from said second portion of said plate member proximate to said second side.

10. A folding mirror assembly as recited in claim 9, wherein said mounting member extends substantially perpendicularly from said top surface of said second portion of said plate member.

11. A folding mirror assembly as recited in claim 9, wherein said plurality of mounting pads of said plate member for mounting said second reflecting member extend from said mounting member.

12. A folding mirror assembly as recited in claim 9, wherein said plurality of mounting pads of said plate member for mounting said second reflecting member extend from said mounting member in a direction away from said first common side of said plate member.

13. A folding mirror assembly as recited in claim 11, wherein an opening extends through said second portion of said plate member, between said first common side and said second side of said plate member.

14. A folding mirror assembly as recited in claim 13, wherein said opening is substantially circular.

15. A folding mirror assembly as recited in claim 13, wherein said second reflecting member is mounted to said plurality of mounting pads of said mounting member along said receiving surface of said support panel.

16. A folding mirror assembly as recited in claim 15, wherein said second reflecting member is mounted to said mounting member, one of said first or second panels of said second reflecting member is below said top surface of said plate member and the other one of said first or second panels of said second reflecting member is above said top surface of said plate member so that light reflected between said reflecting surfaces of said first and second panels of said second reflecting member passes through said opening.

17. A folding mirror assembly, comprising:

at least first and second reflecting members, said first reflecting member having a first reflecting surface in reflecting relation with a second reflecting surface and said second reflecting member having a third reflecting surface in reflecting relation with a fourth reflecting surface; and mounting means for mounting said first and second reflecting members thereon, comprising:

a plate member having a top surface;

a plurality of mounting pads extending from said plate member, to which said first and second reflecting members are mounted; and an opening extending through said plate member, wherein one of said third or fourth reflecting surfaces of said second reflecting member is below said top surface of said plate member, and the other one of said third or fourth reflecting surfaces of said second reflecting member is above said top surface of said plate member, wherein said second reflecting member is mounted to said plate member, so that a beam of light reflected between said third and fourth reflecting surfaces of said second reflecting member passes through said opening.

18. A folding mirror assembly as recited in claim 17, wherein said reflecting surfaces are optically flat.

19. A folding mirror assembly as recited in claim 17, wherein said at least first and second reflecting members each comprise:

at least first and second reflecting members, each of said reflecting members comprising first and second panels, each of said panels having a reflecting surface, said reflecting surface of said first panel disposed at substantially a right angle to said reflecting surface of said second panel, and a support panel having a receiving surface, wherein each of said panels has a side at substantially a right angle to said surface of said panel, and wherein each of said panels is abutting and joined along said side to said surface of said panel immediately adjacent to said side.

20. A folding mirror assembly as recited in claim 19, wherein said first reflecting member is mounted to said plate member along a second surface of said support panel of said first reflecting member, said second surface of said support panel being opposite said receiving surface.

21. A folding mirror assembly as recited in claim 19, wherein said second reflecting member is mounted to said plate member along said receiving surface of said support panel of said second reflecting member.

22. A folding mirror assembly as recited in claim 17, wherein said first reflecting member is mounted to said plate member on three of said plurality of mounting pads.

23. A folding mirror assembly as recited in claim 22, wherein said second reflecting member is mounted to said plate member on three other of said plurality of mounting pads.

24. A folding mirror assembly as recited in claim 17, wherein said plurality of mounting pads of said plate member for mounting said first reflecting member extend from said top surface of said plate member.

25. A folding mirror assembly as recited in claim 24, wherein said plate member comprises a first portion and a second portion, said first and second portions having a common first side.

26. A folding mirror assembly as recited in claim 25, wherein said second portion of said plate member has a second side opposite said common first side.

27. A folding mirror assembly as recited in claim 26, wherein said mounting means further comprises a mounting member extending from said second portion of said plate member proximate to said second side.

28. A folding mirror assembly as recited in claim 27, wherein said mounting member extends substantially perpendicularly from said top surface of said second portion of said plate member.

29. A folding mirror assembly as recited in claim 27, wherein said plurality of mounting pads of said plate member for mounting said second reflecting member extend from said mounting member.

30. A folding mirror assembly as recited in claim 29, wherein said plurality of mounting pads of said plate member for mounting said second reflecting member extend from said mounting member in a direction away from said first common side of said plate member.

31. A folding mirror assembly as recited in claim 30, wherein said second reflecting member is mounted to said plurality of mounting pads of said mounting member along said receiving surface of said support panel.

32. A folding mirror assembly, comprising:

at least first and second reflecting members, each of said reflecting members comprising first and second panels, each of said panels having a reflecting surface, said reflecting surface of said first panel disposed at substantially a right angle to said reflecting surface of said second panel, and a support panel having a receiving surface, wherein each of said panels has a side at substantially a right angle to said surface of said panel, and wherein each of said panels is abutting and joined along said side to said surface of said panel immediately adjacent to said side; and a plate member having mounting means for mounting said first and second reflecting members thereon so that one of said reflecting surfaces of said first reflecting member is in reflecting relation with one of said reflecting surfaces of said second reflecting member;

wherein said first reflecting member is mounted to said plate member along a second surface of said support panel, said second surface of said support panel being opposite said receiving surface.

33. A folding mirror assembly, comprising:

at least first and second reflecting members, each of said reflecting members comprising first and second panels, each of said panels having a reflecting surface, said reflecting surface of said first panel disposed at substantially a right angle to said reflecting surface of said second panel, and a support panel having a receiving surface, wherein each of said panels has a side at substantially a right angle to said surface of said panel, and wherein each of said panels is abutting and joined along said side to said surface of said panel immediately adjacent to said side; and a plate member having mounting means for mounting said first and second reflecting members thereon so that one of said reflecting surfaces of said first reflecting member is in reflecting relation with one of said reflecting surfaces of said second reflecting member;

wherein said second reflecting member is mounted to said plate member along said receiving surface on said support panel.

* * * * *